(12) United States Patent
Smith et al.

(10) Patent No.: US 10,502,622 B2
(45) Date of Patent: Dec. 10, 2019

(54) DETECTOR CONTROL AND DATA ACQUISITION WITH CUSTOM APPLICATION SPECIFIC INTEGRATED CIRCUIT (ASIC)

(71) Applicant: U.S.A., as represented by the Administrator of the National Aeronautics and Space Administration, Washington, DC (US)

(72) Inventors: Brian S. Smith, Annapolis, MD (US); Markus Loose, Thousand Oaks, CA (US); Atul Joshi, Thousand Oaks, CA (US); Greg T. Alkire, Chester, MD (US); Daniel P. Kelly, Columbia, MD (US); Edward S. Cheng, Glenn Dale, MD (US)

(73) Assignee: U.S.A. as represented by the Administrator of the National Aeronautics and Space Administration

( * ) Notice: Subject to any disclaimer, the term of this patent is extended or adjusted under 35 U.S.C. 154(b) by 11 days.

(21) Appl. No.: 15/629,297

(22) Filed: Jun. 21, 2017

(65) Prior Publication Data
US 2018/0003559 A1   Jan. 4, 2018

Related U.S. Application Data

(60) Provisional application No. 62/357,044, filed on Jun. 30, 2016.

(51) Int. Cl.
*G01J 3/10* (2006.01)
*G01J 1/42* (2006.01)
*G01J 1/44* (2006.01)
*G01J 1/02* (2006.01)
*H04N 5/33* (2006.01)

(52) U.S. Cl.
CPC ............. *G01J 3/108* (2013.01); *G01J 1/0252* (2013.01); *G01J 1/4228* (2013.01); *G01J 1/44* (2013.01); *H04N 5/33* (2013.01)

(58) Field of Classification Search
CPC ........ G01J 3/108; G01J 1/0252; G01J 1/4228; G01J 1/44; H04N 5/33
USPC ....... 250/370.01, 370.06, 366, 349; 341/126, 341/155, 158
See application file for complete search history.

(56) References Cited

U.S. PATENT DOCUMENTS

| | | | | |
|---|---|---|---|---|
| 2,298,987 A | * | 10/1942 | Thomsen | H03G 5/06 330/126 |
| 2,629,025 A | * | 2/1953 | Roberts | H03H 11/12 330/104 |
| 3,287,580 A | * | 11/1966 | Broniewski | H02K 3/22 310/201 |

(Continued)

*Primary Examiner* — David P Porta
*Assistant Examiner* — Blake C Riddick
(74) *Attorney, Agent, or Firm* — Heather Goo; Bryan A. Geurts

(57) ABSTRACT

A custom application-specific integrated circuit (ASIC) may provide strong signal integrity while reducing the load to a thermal system. Control and analog-to-digital conversion may be pushed into components close to the detector to maximize signal integrity. Processing functions may be performed at relatively high temperature, or the highest allowable temperatures, simplifying the system-level thermal design by not cooling components that do not require such cooling to function.

20 Claims, 5 Drawing Sheets

(56) References Cited

U.S. PATENT DOCUMENTS

| | | | | |
|---|---|---|---|---|
| 4,039,740 A * | 8/1977 | Iwata | H01B 12/02 | 174/120 FP |
| 4,052,686 A * | 10/1977 | Schmitz | G01D 5/2258 | 336/199 |
| 4,184,042 A * | 1/1980 | Vulis | H01B 12/02 | 174/125.1 |
| 4,255,769 A * | 3/1981 | Naylor | H03F 1/303 | 360/65 |
| 4,755,676 A * | 7/1988 | Gaalema | F25D 19/006 | 250/352 |
| 5,118,946 A * | 6/1992 | Smith | H04N 5/33 | 250/332 |
| 5,786,597 A * | 7/1998 | Lingren | G01T 1/161 | 250/370.01 |
| 6,194,726 B1 * | 2/2001 | Pi | G01T 1/161 | 250/363.02 |
| 6,295,016 B1 * | 9/2001 | Chiang | H03M 1/0602 | 341/155 |
| 7,170,062 B2 * | 1/2007 | Vuorela | H01L 27/14634 | 250/370.09 |
| 2002/0093447 A1 * | 7/2002 | Li | H03M 1/141 | 341/158 |
| 2002/0175843 A1 * | 11/2002 | Sonkusale | H03M 1/1004 | 341/120 |
| 2003/0221113 A1 * | 11/2003 | Kupka | G06F 21/10 | 713/189 |
| 2004/0085667 A1 * | 5/2004 | Chung | G11B 5/09 | 360/67 |
| 2004/0256142 A1 * | 12/2004 | Masuda | H01R 9/032 | 174/125.1 |
| 2005/0052894 A1 * | 3/2005 | Segal | B82Y 10/00 | 365/129 |
| 2005/0104003 A1 * | 5/2005 | Jarron | H03F 3/087 | 250/370.14 |
| 2006/0050162 A1 * | 3/2006 | Nakamura | H04N 5/335 | 348/308 |
| 2006/0181627 A1 * | 8/2006 | Farrier | H01L 27/14603 | 348/308 |
| 2007/0273438 A1 * | 11/2007 | Hickman | H03F 3/211 | 330/69 |
| 2008/0129567 A1 * | 6/2008 | Lee | H03M 1/002 | 341/155 |
| 2009/0184346 A1 * | 7/2009 | Jain | B82Y 10/00 | 257/288 |
| 2009/0189798 A1 * | 7/2009 | Sasaki | H03M 1/08 | 341/161 |
| 2010/0328129 A1 * | 12/2010 | Chou | H03M 1/129 | 341/159 |
| 2011/0102220 A1 * | 5/2011 | Nam | H03M 1/0836 | 341/122 |
| 2012/0146822 A1 * | 6/2012 | Kang | H03M 1/08 | 341/110 |
| 2012/0242404 A1 * | 9/2012 | Rajasekhar | H03F 3/005 | 330/69 |
| 2012/0287418 A1 * | 11/2012 | Scherer | G01N 21/61 | 356/51 |
| 2013/0235210 A1 * | 9/2013 | Tinkler | G01J 5/20 | 348/164 |
| 2015/0085985 A1 * | 3/2015 | Funaki | H03M 1/145 | 378/98 |
| 2015/0187439 A1 * | 7/2015 | Querbach | G11C 29/36 | 714/719 |
| 2016/0268331 A1 * | 9/2016 | Parmesan | H01L 27/14641 | |
| 2017/0006236 A1 * | 1/2017 | French | H01L 27/14609 | |
| 2017/0123715 A1 * | 5/2017 | Zhang | G06F 3/061 | |
| 2018/0283958 A1 * | 10/2018 | Forg | G01J 5/0881 | |

* cited by examiner

DETECTOR CONTROL AND DATA ACQUISITION WITH CUSTOM APPLICATION SPECIFIC INTEGRATED CIRCUIT (ASIC)

CROSS REFERENCE TO RELATED APPLICATION

This application claims the benefit of U.S. Provisional Patent Application No. 62/357,044 filed Jun. 30, 2016. The subject matter of this earlier-filed application is hereby incorporated by reference in its entirety.

STATEMENT OF FEDERAL RIGHTS

The invention described herein was made by employees of the United States Government and may be manufactured and used by or for the Government for Government purposes without the payment of any royalties thereon or therefore.

FIELD

The present invention generally relates to signal processing, and more specifically, to a custom application specific integrated circuit (ASIC) that provides strong signal integrity while reducing the load to the thermal system.

BACKGROUND

Instruments that have cold operating temperatures can place significant constraints on hardware. For instance, modern generation large astronomy focal plane arrays (FPAs) place stringent demands on the control and data acquisition electronic support systems. Most of the detectors used in these FPAs require cryogenic operation, and present interesting signal integrity and thermal isolation trades and challenges. At one extreme, a solution for hybrid detectors is to incorporate ever-increasing functions into the Read-Out Integrated Circuit (ROIC). Using modern CMOS designs, these ROICs can be made to include all control and even data acquisition (analog-to-digital conversion) functions, providing a true photons-to-bits capability in a single device. However, the additional power dissipation at the cold detector may present an undesirable system-level thermal trade.

At the other extreme, for small numbers of detectors, it is possible to use only electronics at the warm ambient temperature of the instrument with a relatively simple and low-power ROIC. However, this approach requires extreme care in interconnect design since the main thermal isolation needs to ensure signal integrity for very low-level analog signals over potentially large distances. Accordingly, an improved design that balances good thermal isolation with high signal integrity may be beneficial.

SUMMARY

Certain embodiments of the present invention may provide solutions to the problems and needs in the art that have not yet been fully identified, appreciated, or solved by conventional signal processing technologies. For example, some embodiments pertain to a custom ASIC that provides strong signal integrity while reducing the load to the thermal system.

In an embodiment, a detector system includes a detector including an array of diodes configured to detect photons and a ROIC operably connected to the array of diodes. The ROIC is configured to multiplex and output analog signals from the array of diodes. The detector system also includes an ASIC configured to receive the output analog signals from the ROIC, convert the received analog signals to digital signals, and output the digital signals. The detector system further includes processing circuitry configured to receive and process the digital signals output by the ASIC. The ASIC is connected to the ROIC and the processing circuitry via respective cables. The cable connecting the ASIC to the ROIC is shorter than the cable connecting the ASIC to the processing circuitry. The cable connecting the ASIC to the ROIC has a lower impedance and less thermal insulation than the cable connecting the ASIC to the processing circuitry.

In another embodiment, an ASIC includes a plurality of preamplifiers configured to receive and amplify analog signals from a ROIC of a detector. The analog signals include data pertaining to infrared or near-infrared photons detected by diodes of the detector. The ASIC also includes a plurality of analog-to-digital converters (ADCs) configured to convert the amplified analog signals from the plurality of preamplifiers to digital signals a plurality of math blocks configured to perform configurable processing of the digital signals from the plurality of ADCs to process the data pertaining to the infrared or near-infrared photons.

In yet another embodiment, an ASIC includes a plurality of preamplifiers configured to receive and amplify analog signals and a plurality of ADCs configured to convert the amplified analog signals from the plurality of preamplifiers to digital signals. The ASIC also includes a plurality of math blocks configured to perform configurable processing of the digital signals from the plurality of ADCs. The ASIC is connected to a ROIC and processing circuitry via respective cables. The cable connecting the ASIC to the ROIC is shorter than the cable connecting the ASIC to the processing circuitry. The cable connecting the ASIC to the ROIC has a lower impedance and less thermal insulation than the cable connecting the ASIC to the processing circuitry.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Figure 1:
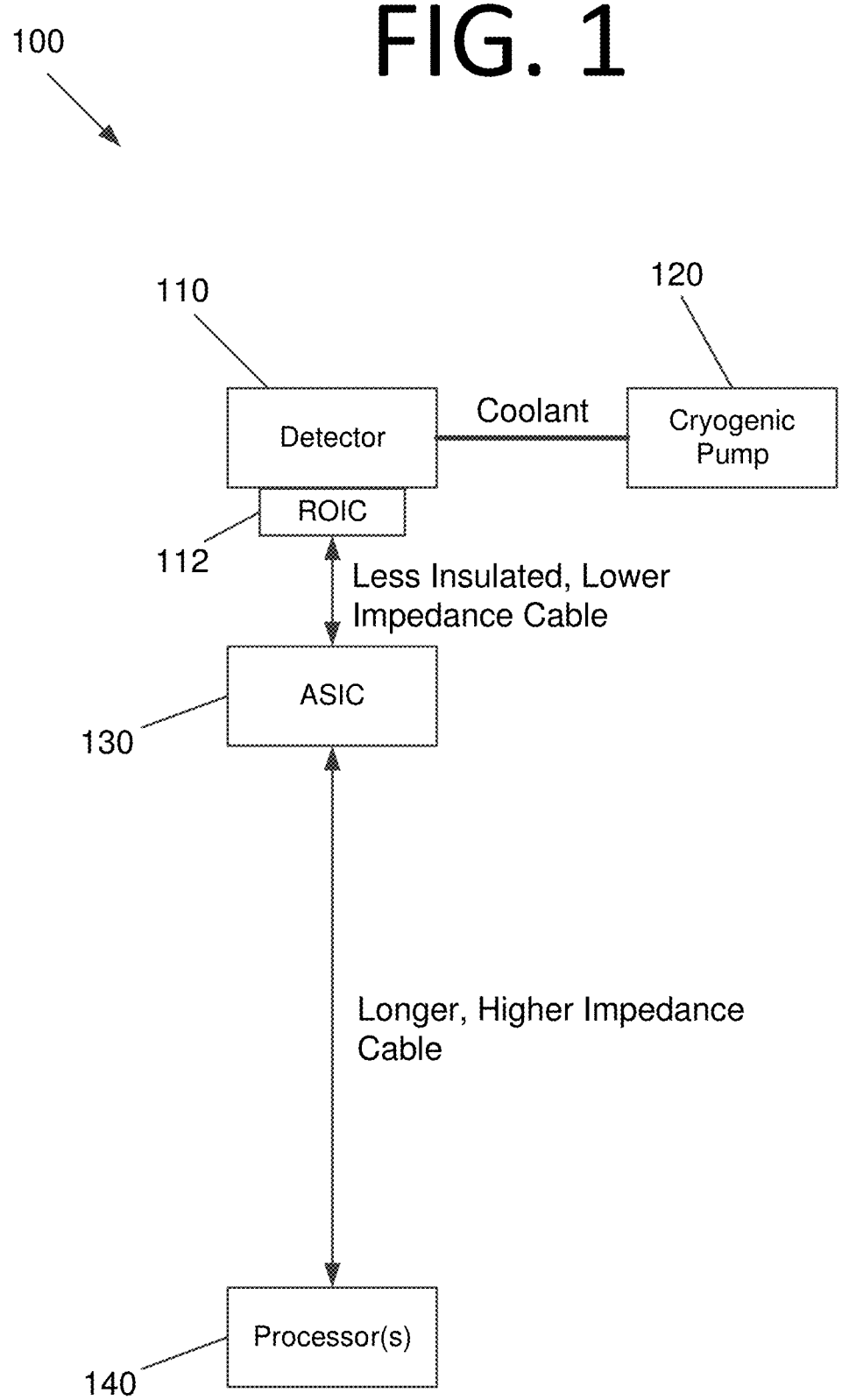
FIG. 1 is an architectural diagram illustrating a detector system, according to an embodiment of the present invention.

Some embodiments of the present invention pertain to a custom ASIC that provides strong signal integrity while reducing the load to the thermal system. More specifically: (1) control and analog-to-digital conversion is pushed into components close to the detector to maximize signal integrity; and (2) processing functions are performed at relatively high temperatures, or the highest allowable temperatures, simplifying the system-level thermal design by not cooling components that do not require such cooling to function. However, while some embodiments may be particularly well-suited for cryogenic operating detectors, certain embodiments may be used for any suitable system digitizing signals including, but not limited to, parallel processing, medical devices, scientific instruments, low Earth orbit (LEO) satellite imaging, digital photography and video, etc., without deviating from the scope of the invention.

The Wide-Field Infrared Survey Telescope (WFIRST), which NASA is planning to launch in the early 2020s, is the next large space astrophysical observatory after the James Webb Space Telescope (JWST). WFIRST entered Phase A of development in early 2016. The main imaging camera, the Wide-Field Instrument (WFI), will use a mosaic of 18 4,000×4,000 pixel format near-infrared (IR) detectors to conduct the surveys required for cosmology and exoplanet (microlensing) studies. This will be the largest infrared focal plane flown on a NASA mission, and presents interesting engineering challenges in material selection, thermal design, and electrical architecture. The material for the mosaic plate and the detector packages is currently a silicon/aluminum alloy with a silicon content of approximately 80% that operates at low temperatures, Sandvik Osprey™ CE6, which was chosen for its low mass, high thermal conductivity, and mechanical stability. The detector operating temperature of 90 to 100 kelvin (K) is maintained by an ultra-low vibration reverse-Brayton cycle mechanical cryocooler.

Electrical Architecture Design

For the WFIRST electrical architecture, it is desirable to maximize signal (and thus, data) integrity, while simultaneously minimizing the load to the thermal system. These two aims are typically in conflict with one another, but strong signal integrity and a reduced or minimal thermal load are possible with some embodiments. In order to achieve both goals, a low impedance connection may be provided between the ASIC and the ROIC to ensure good signal quality. This, in turn, requires the amount of thermal insulation to be relatively low (i.e., high thermal conductance, because low electrical impedance necessarily means low thermal insulation due to the material properties of metal). However, this relatively low thermal insulation is acceptable because the ASIC and ROIC can be at the same temperature (or close in temperature), such that the thermal load is still small (since thermal load goes with the $4^{th}$ power of the temperature difference $\Delta T$). If the ASIC was missing, low electrical impedance would be required between the cold ROIC and the warm electronics, thus causing a large thermal load on the system. Using the cold ASIC, the connection to the warm side can use higher impedance cables since communications are digital. This reduces overall thermal load.

More thermally insulated cables typically have a higher impedance, but the relative proximity of the ASIC to the ROICs in both distance and temperature ensures strong signal integrity without significant thermal leakage. The ASIC may be connected to one or more processors that are further from the detectors and ROICs via a higher impedance, more thermally insulated cable that is relatively long (e.g., several feet in some embodiments). This ensures that a strong integrity signal reaches the processor(s), which run at near room temperature, and that the processor(s) are kept at a distance from the detectors.

FIG. 1 is an architectural diagram illustrating such a detector system 100, according to an embodiment of the present invention. System 100 includes a detector 110. In some embodiments, detector 110 needs to be kept at cryogenic temperatures (for instance, to perform infrared or near-infrared detection). For WFIRST, the detector temperatures are approximately 90-100K, but may be 77K (the temperature of liquid nitrogen), or even as cold as 40K in some embodiments. In order to achieve and maintain cryogenic temperatures, a cryogenic pump 120 circulates coolant to detectors 110.

In order to detect infrared or near-infrared photons, for example, which have a lower energy than visible light, a lower bandgap material is required that is excited at this lower energy. These materials are easily excitable by heat, so they must be kept at relatively low temperatures for detector applications such as WFIRST, where relatively few infrared photons are to be received and detected from distant sources. How low this temperature is depends on the wavelength to be detected. Detector 110 may be constructed from a silicon/aluminum alloy in some embodiments.

Detector 110 is functionally a two-dimensional array of "pixels" (i.e., diodes) in a sensitive material layer. Pixels of detector 110 detect infrared or near-infrared photons, and the very sensitive analog signals from the pixels are multiplexed in series to a signal amplifier of the ROIC 112 that drives the signal off-chip to ASIC 130 in the form of output analog video channels (e.g., 32 channels). ROIC 112 may be a 2.5 µm cutoff HgCdTe material in some embodiments, such as the Teledyne Imaging Sensors™ H4RG-10 ROIC. The typical operating configuration of this Teledyne™ ROIC is a 100 or 200 kHz pixel rate, 32 or 64 video outputs, and continuous frame readout (sampling up the ramp).

Because the output signals are very sensitive analog signals, it is beneficial to only transmit these signals over a relatively short distance. Thus, ASIC 130 is located relatively close to detector 110 and ROIC 112, and signals are transmitted therebetween via a lower impedance cable. This design choice minimizes the number of wires (and thus the parasitic thermal loading) between the detectors and the warm electronics. More importantly, low noise video signals do not need to be transmitted over large distances and through several thermal zones, and the distances are short enough that strong signal integrity is maintained, despite the higher impedance.

ASIC 130 provides analog biases, digital clocking, and analog-to-digital conversion functions of the video channels for ROIC 112. Both ROIC 112 and ASIC 130 (i.e., the "cold" electronics) may be at temperatures in the range of 80K to 180K in some embodiments. ASIC 130 may also include a sequencer with the option of microprocessor control for more elaborate readout schemes that may be data-dependent.

Converted, amplified digital signals derived from the input analog video channels are then output by ASIC 130 to processor(s) 140 to perform more processing-intensive functions and analysis. These digital signals are transmitted via a higher impedance, more thermally insulated cable. Processor(s) 140 may also cause data to be transmitted to other computing systems, or to Earth-based receivers in the case of WFIRST. Processor(s) 140 (i.e., the "warm" electronics) may perform processing functions, such as controlling higher-level focal plane operation, at the maximum allowable temperatures (e.g., approximately 300K in some embodiments). Indeed, heat emitted by ROIC 112, ASIC 130, and processor(s) 140, and may not degrade the performance of detectors 110 by more than 10% in some embodiments. Processor(s) 140 may be connected to multiple ASICs from multiple detectors in some embodiments. For instance, in the case of WFIRST, processor(s) 140 may also be responsible for configuring ASIC 130, as well as overall focal plane synchronization and commanding of the 18 distinct detectors and their cold electronics. Communication between the cold and warm electronics use may multiple low-voltage differential signaling (LVDS) lines in a cable. Conditioned power for ASIC 130 may also be provided by processor(s).

Adc Test Chip

A prototype analog-to-digital converter (ADC) test chip was developed and manufactured as a proof-of-concept of the ADC architecture, bias generator, and amplifier designs. For basic transistor characterization, the IDS-VDS and IDS-VGS I/V curves were measured for each transistor type and geometry at 295 K, 200 K, 150 K, and 80 K. The measured curves were found to match the models provided by the foundry within 10% over the temperature range.

Figure 2:
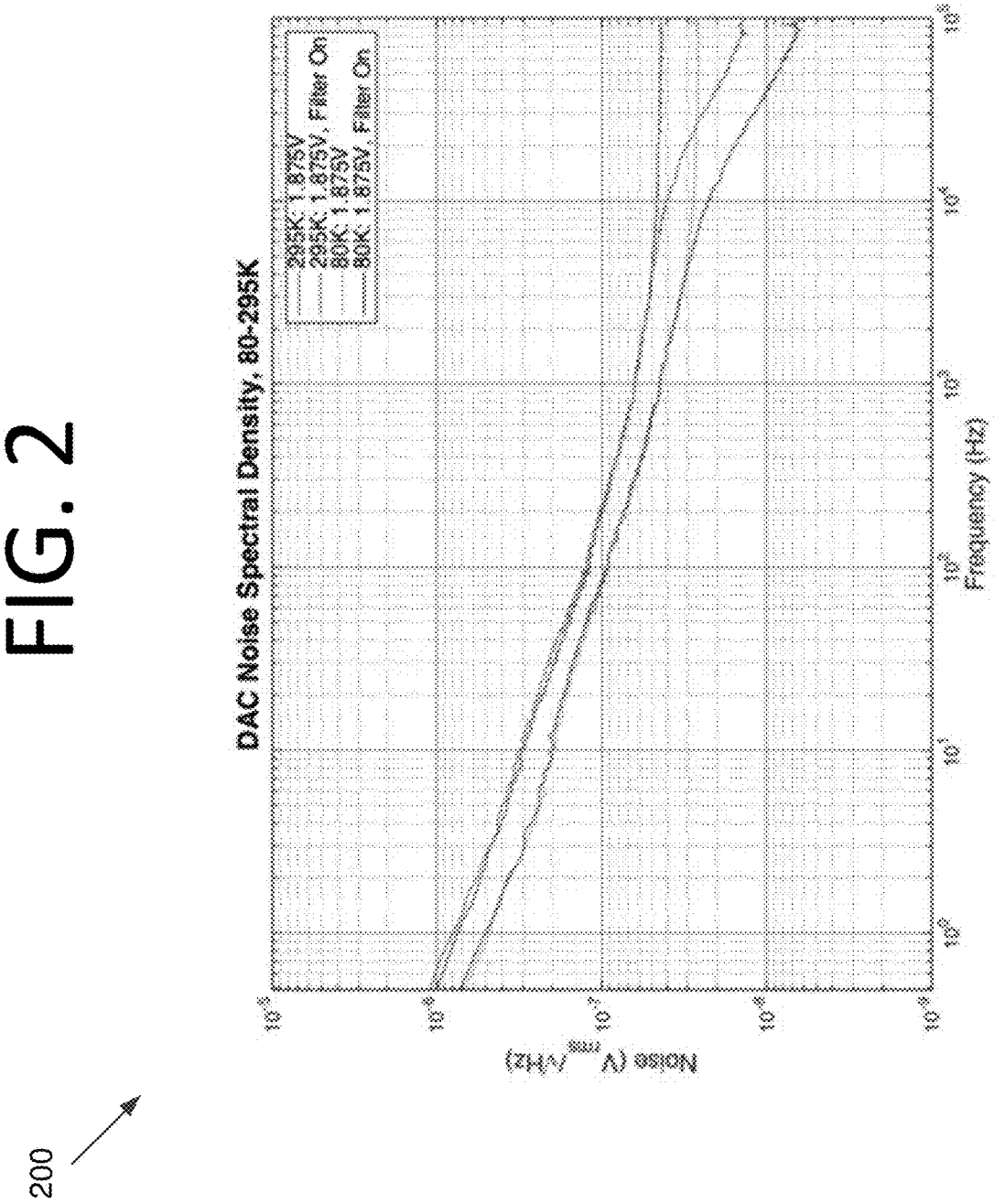
FIG. 2 is a graph illustrating digital-to-analog converter (DAC) noise spectral density in the 0 to 2 V range at 295 K and 80 K with the internal CMOS filter capacitor switched on and off, according to an embodiment of the present invention.

The digital-to-analog converter (DAC) test circuit included a 4-bit R-2R ladder plus range selection bit, internal filter, and output amplifier that buffers the output for the 0 to 2 V range (non-inverting), or for the 2 to 4 V range (inverting). The 2 V reference used for testing the DAC was generated externally. The DAC circuitry was characterized for application as internal and external (detector) biases in the ASIC. The total noise (15 mHz-100 kHz) on the DAC output between 0 to 2 V was 8.5 µVrms at 295K and 4.8 µVrms at 80K. Due to the inverting amplifier configuration with an additional feedback resistor in the upper range (2-4V), the noise is slightly higher. The DAC noise spectrum at 295 K and 80 K for the 0 to 2 V range and with internal CMOS filter capacitor switched on and off. See graph 200 of FIG. 2. An instability driving capacitive loads in the 100 nF to 5 µF range was found in the DAC output amplifier. Programmable compensation capacitances in subsequent phases of the ASIC design controls this instability.

The CMOS bandgap reference was also characterized between 295 K and 80 K with noise and stability measured at the two temperature extremes. With an external 10 uF ceramic bypass capacitor on the unbuffered bandgap node, total noise (15 mHz-100 kHz) on the buffered reference output is 5.8 µVrms at 295 K and 5.0 µVrms at 80 K. The reference is stable to +/-45 ppm over a 200-hour period.

Cryogenic operability and performance of the current source and amplifiers were also measured. All performed well across the operating temperature range, with the current source displaying 160 pArms input referred noise at 295 K and 250 pArms at 80 K. The amplifiers demonstrated total noise from 4.7 µVrms to 6.5 µVrms at 295 K depending on topology and 5.1 µVrms to 6.2 µVrms noise at 80 K (bandwidth of 15 mHz to 100 kHz).

Figure 3:
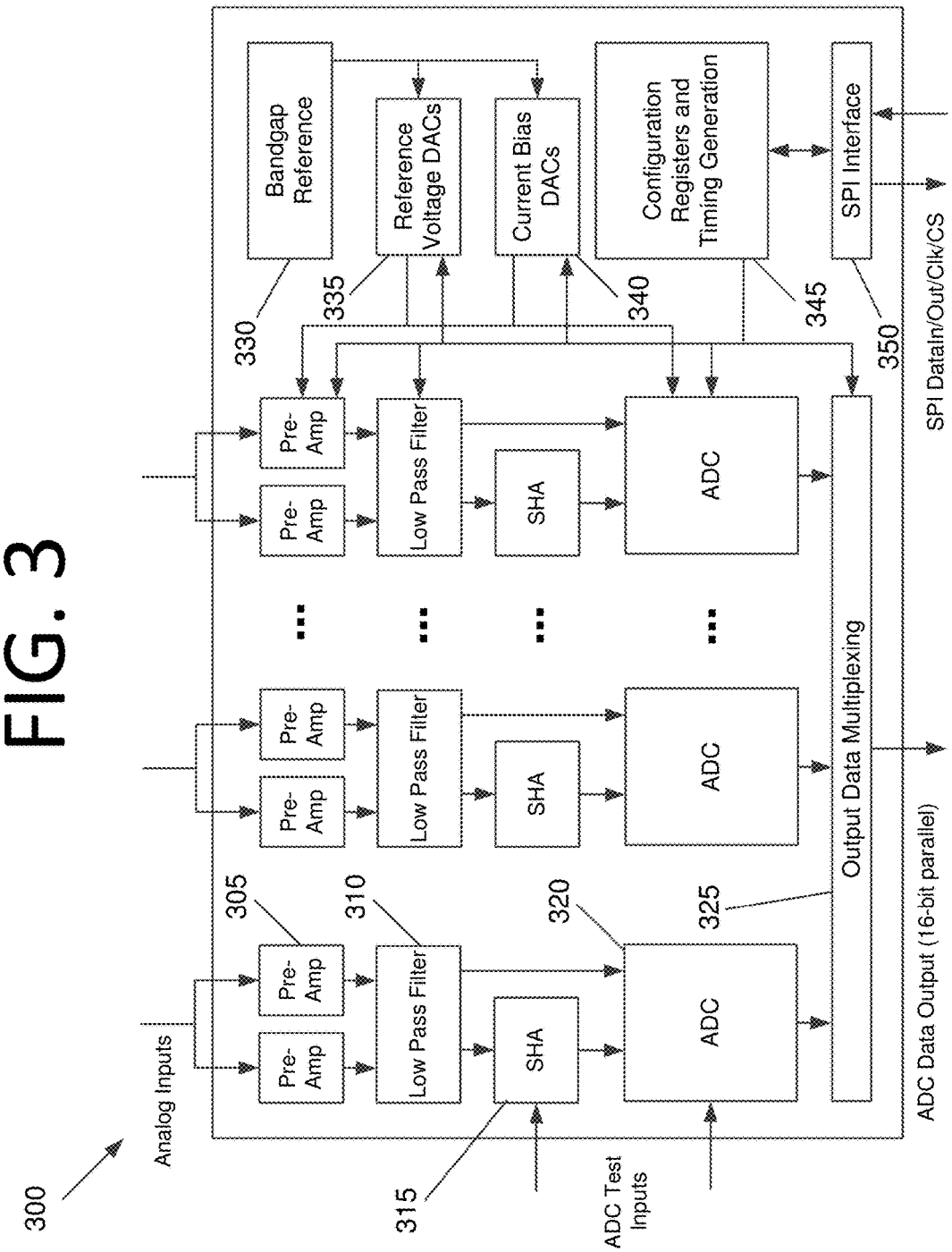
FIG. 3 is an architectural diagram illustrating an analog-to-digital converter (ADC) test chip, according to an embodiment of the present invention.

FIG. 3 is an architectural diagram illustrating an ADC test chip 300, according to an embodiment of the present invention. ADC test chip 300 implements an 8-channel data conversion system with selectable resistive or capacitive preamplifiers 305. Control uses a serial peripheral interface (SPI) 350 to read and write internal registers. The 8 ADC outputs are multiplexed by multiplexor 325 (i.e., output data multiplexing) into a 16-bit parallel bus. Configuration registers and timing generators 345 are more flexible than would be required or desirable for a full ASIC design in some embodiments, but the intent for this example is to be able to adjust almost all the timing parameters to help understand how to optimize the design. The requirements for ADC test chip 300 were based on the requirements for the full ASIC design for WFIRST. The key ADC-level requirements for both the test chip and the final full ASIC of an embodiment are summarized in Table 1 below.

TABLE 1

ADC KEY REQUIREMENTS

| Parameter: | Units: | Specification: | Measured (@100 Ksps): | Comments |
|---|---|---|---|---|
| ADC Resolution | bits | 16 | 16 | Up to 2 Msps min. |
| Noise | bits | <1 | 0.75 | |
| Differential Nonlinearity (DNL) | bits | <+/-0.5 | +1.5/-1 | High DNL due to clock race condition in ADC timing. |
| Integral Nonlinearity (INL) | bits | <+/-2 | +/-3 (295K) +/-6.5 (80K) | N/A |
| Power (per ADC @ 100 kHz) | mW | <3 | 4 (295K) 12 (80K) | The large measured value is related to the fabrication error in the resistor ladder which is expected to be corrected in the next revision. |
| Power (per ADC @ 200 kHz) | mW | <5 | N/A | N/A |
| Power Specification Temperature | K | <140 | N/A | N/A |
| Maximum conversion speed (goal) | Msps | 10 | N/A | At 14-bit resolution. |
| Operating Temperature | K | 80 to 300 | 80 to 300 | N/A |
| Pitch | µm | 400 | N/A | To fit into full ASIC floor plan. |

A configurable preamp section (i.e., preamplifiers 305 and low pass filters 310) provide signal conditioning of the detector video signals before digitization. Its purpose is to provide gain, noise filtering, and sufficiently low impedance to drive the ADC. Two different preamp options are available for each channel: resistive feedback or capacitive feedback. When using the resistive feedback option, continuous mode operation is enabled that does not require any clocking or resetting. The amplifier can be configured as a single-ended, fully differential, or instrumentation amplifier (two high impedance inputs). When using the capacitive feedback option, some clocking is required to perform periodic resets of the capacitive feedback network. A correlated double sampling mode is provided that removes possible kTC noise introduced by the amplifier reset. The capacitive feedback mode offers somewhat lower noise and higher linearity, but the resistive feedback mode is attractive due to its simplicity in operation (no clocking) and uninterrupted amplification (no reset).

A fully differential sample and hold amplifier (SHA) 315 is incorporated between low pass filter 310 and ADC 320 to condition the preamplifier output for ADC 320. ADC 320 has a large input capacitance and requires the input to settle within a fraction of the cycle time. Since the preamplifier needs to gain up small detector signals, it has a high gain bandwidth product requirement, making it power-inefficient for driving the large load of ADC 320. Unity-gain SHA 315 efficiently drives ADC 320 and also helps to convert the preamplifier output common mode voltage to one that is better matched with the input common mode requirement of ADC 320. SHA 315 also has a correlated double sample (CDS) mode where SHA 315 can sequentially sample two inputs from the preamplifier and provide the difference to ADC 320. This mode attenuates the low frequency correlated noise components such as the preamp kTC and 1/f noise.

ADC 320 is a multi-sample conversion architecture using a 2-step 5-bit flash conversion followed by an 8-bit successive approximation conversion. First, ADC 320 samples the output from SHA 315 with a 5-bit flash stage to estimate the coarse range of the inputs (the 5 most significant bits (MSBs)) within the full-scale of ADC 320. Full scale of ADC 320 can be programmed to be as large as +/−2 V fully differential range (i.e., a 4 V peak-to-peak single-ended range). Once the coarse-range is determined, this value is subtracted from the input and new references that are closer to the input level are generated for the flash. The flash re-samples this first residue and does a fine conversion within this smaller range, again subtracting this conversion from first residue to create the second step residue.

Once this two-step flash conversion is over, the second step residue is re-sampled by an 8-bit successive approximation register (SAR) stage of ADC 320. This stage gets an even finer reference, within a few mV of the input level, in order to determine the 8 LSBs of 16-bit ADC 320. This stage takes 8 cycles to successively approximate the 8 bits, starting from the MSB, down to the LSB. Once the SAR conversion is over, the two 5-bit flash outputs and the 8-bit output from the SAR (total of 18 bits) are provided to a digital error correction block. This block uses the inherent overlap in the stages and generates the final 16 bits that are immune to each stage's saturation effects due to noise, offset, charge injection, or other causes. Effectively, ADC 320 successively approximates the 16 bits in 10 cycles. There are additional cycles provided for sampling and settling. Due to the higher internal clock rate of ADC 320, it is provided a sample clock, as well as a fast oversampling clock, from the clock generator. In ADC test chip 300, several of internal clocks are fully programmable for evaluating detailed circuit performance.

The architecture converts a differential voltage input to 16 bits in an extremely power-efficient manner. ADC 320 incorporates several programmable functions that make the architecture scalable. ADC 320 biases and references are fully programmable, since the bias block generates them. Internal clocks of ADC 320 are programmable. In addition, each circuit element in ADC 320 has programmable bandwidth and programmable swing. This allows the power dissipation to be optimized from rates as low as 100 kHz to those as high as several MHz. The power can be optimized for the chosen bit resolution, as well as for the operating temperature. This can range from cryogenic to room temperatures. The test chip has demonstrated the highly scalable power-efficient ADC architecture to be fully functional. ADC test chip 300 incorporates an improved design that will demonstrate the desired power dissipation, as well as linearity performance.

Bandgap reference 330 provides a global reference voltage for all analog functions of the ASIC. More specifically, bandgap reference 330 produces the main reference for reference voltage DACs 335 and the main current reference for current bias DACs 340. Reference voltage DACs 335 are used to generate reference and bias voltages for the ROIC and for the ASIC-internal preamplifiers and ADCs. Current bias DACs 340 provide internal bias currents to analog circuits inside the preamplifiers, the ADCs, and the bias generator.

Full ASIC Design

Figure 4:
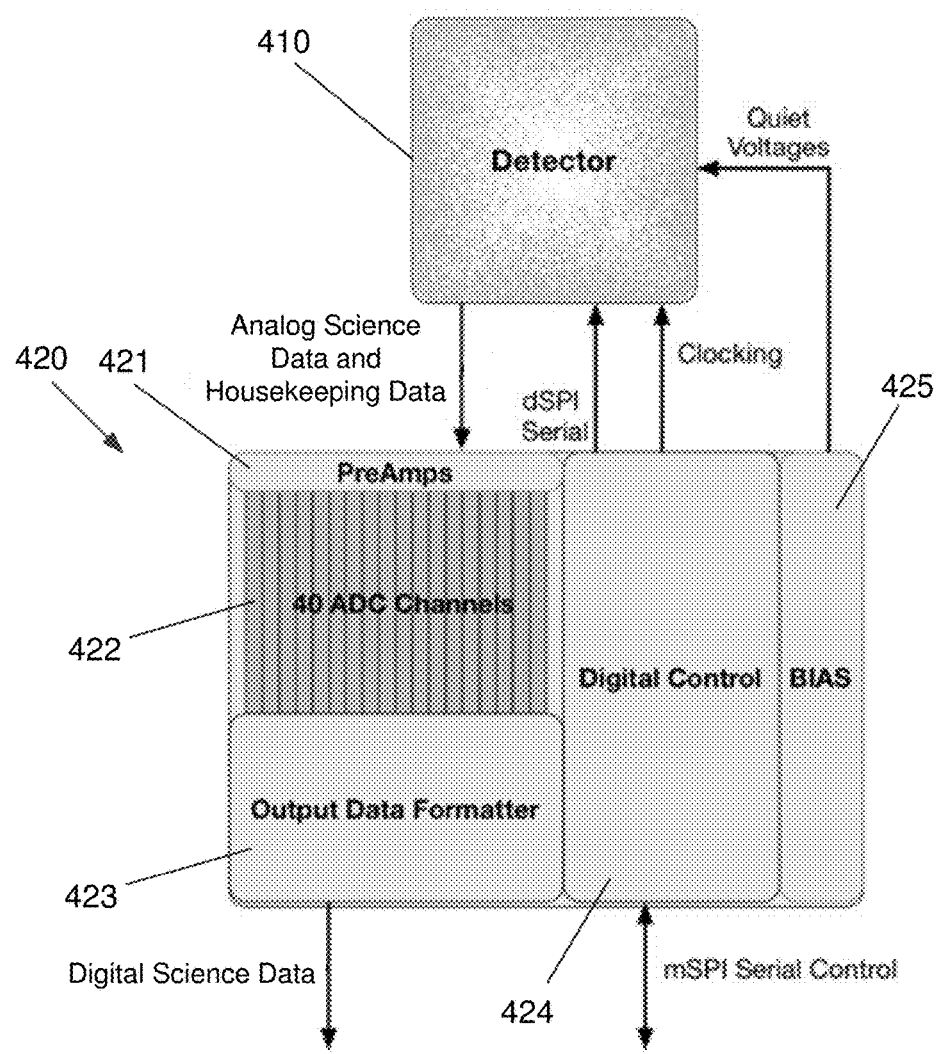
FIG. 4 is an architectural view illustrating a cold detector electronics system, according to an embodiment of the present invention.

An ASIC in accordance with an embodiment has been designed. See ASIC 420 of cold detector electronics system 400 of FIG. 4. The key design drivers for the ASIC of some embodiments are to provide consistency, repeatability, and accuracy in detector timing control and conversion operations. System 400 includes a detector 410 (including an ROIC) and an ASIC 420. Detector 410 provides 32 channels of analog science data (e.g., video channels), plus 8 housekeeping channels. The additional 8 housekeeping channels serve to provide redundancy to the science data channels and to provide sampling of temperatures and voltages in the application. This analog science data and housekeeping data is received by preamplifiers 421 of ASIC 420. The amplified analog science data and housekeeping data is then provided to the 40 ADC channels 422. Each of the 40 ADC channels includes a complete independent ADC for the amplified signal output in some embodiments. An output data formatter 423 formats the digital data, and up to 16 channels of LVDS digital science data are output to warm electronics.

Digital control 424 provides send/receive mSPI serial control data. mSPI serial control is the primary control interface for the warm electronics. It also provides ASIC memory and register access. Digital control 424 also provides dSPI serial control for configuration of detector 410 and clocking for digital control of detector 410 from the pattern generator. Bias 425 provides quiet voltages to detector 410. Up to 24 biases may be provided to detector 410 in this embodiment.

Figure 5:
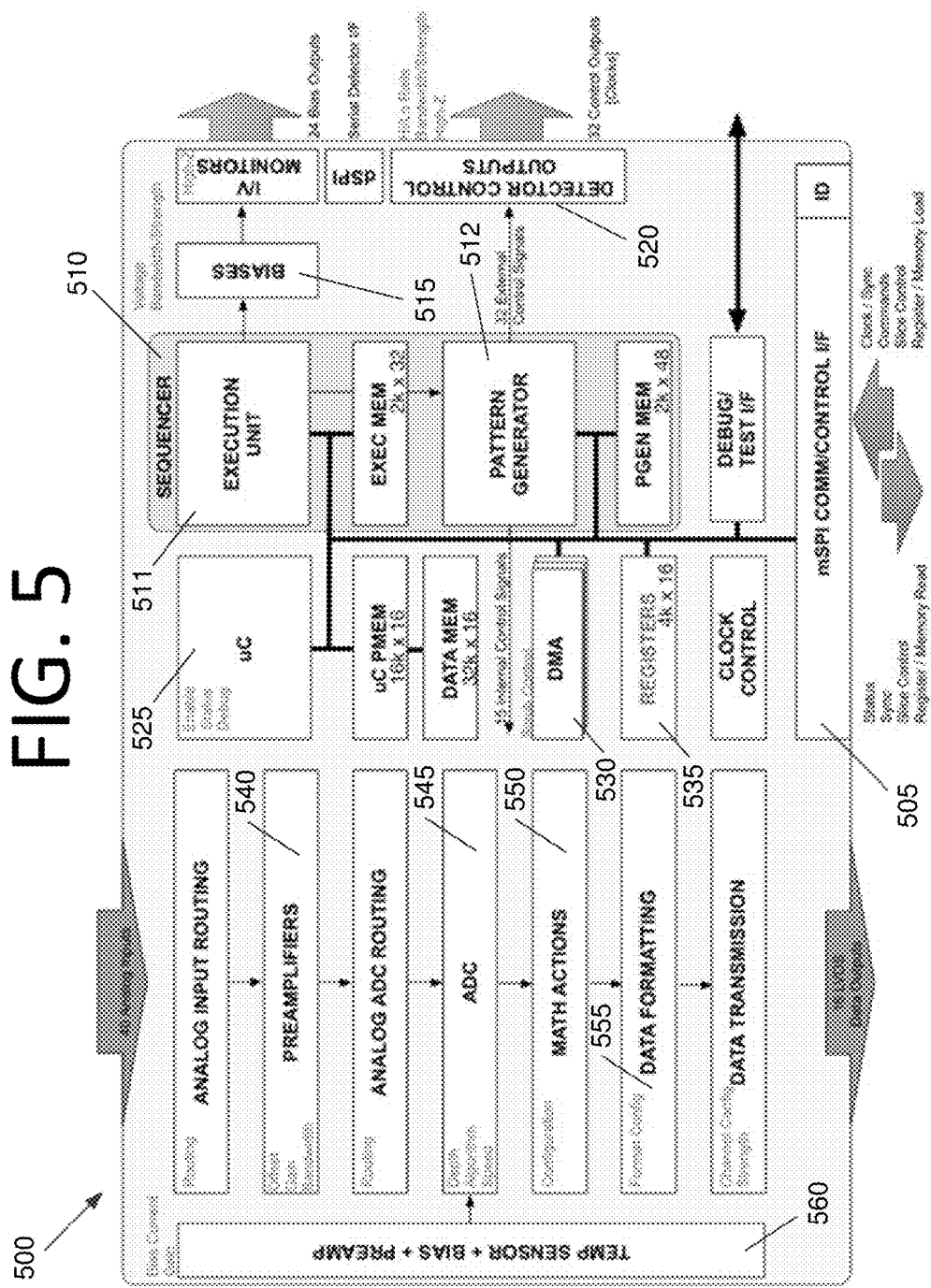
FIG. 5 is an architectural diagram illustrating an ASIC, according to an embodiment of the present invention.

FIG. 5 is an architectural diagram illustrating an ASIC 500, according to an embodiment of the present invention. Basic operation is controlled by mSPI interface 505 working in concert with the ASIC internal sequencer 510. For most applications, programming sequencer 510 (loading up the EXEC and PGEN memories) provides sufficient control of the detector system. Sequencer 510 controls a bank of biases 515 and detector control (clock) outputs 520 directly through configuration registers of execution unit 511 and a pattern generator 512, respectively. Once the EXEC and PGEN memories are loaded with commands and control patterns, respectively, ASIC 500 can operate the detector system independently, providing converted data in a stream to the warm electronics. This provides consistent, repeatable operation of the detector system while avoiding unnecessary noise.

When sequencer 510 provides sufficient flexibility for the application, an embedded microcontroller 525, for example, based on an open source msp430 design (openmsp430) in this embodiment, can be disabled. For more complicated applications, 16-bit microcontroller 525 provides additional control functions through its ability to read and write all configuration registers and memories using direct memory access (DMA), and to provide on-chip processing. A DMA controller 530 can also provide automatic data scrubbing for the on-chip dynamic memories to correct errors caused by high energy cosmic particles. Configuration registers 535 are constructed from radiation-hardened designs for the basic flip-flops. All memories are protected from single-event upsets by error correction logic. One of the more challenging features of this architecture is to support deterministic multi-port access to these elements. The multi-port arbitration logic is configurable to provide flexibility, as well as supporting debugging.

The state of ASIC 500 is monitored by 128 status bits, which can be read by microcontroller 525 or sequencer 510, and provides a way of mapping specific conditions to a set of actions. This includes certain conditions within the math blocks that provide efficient detection of certain conditions (e.g., signals reaching a certain threshold value).

Analog inputs are routed to preamplifiers 540 and then to a set of ADCs 545. The outputs of ADCs 545 go through basic math blocks 550 that provide the ability to perform configurable processing of the output streams from ADC 545. If desired, microcontroller 525 has the ability to examine the results of that processing. This feature can be used to implement elaborate readout schemes to take data-dependent readout control based on real-time pixel values. The outputs from math block 550 then go to a data formatter 555 and are then transmitted to the warm electronics. An on-board temperature sensor is also available to feed into the data stream as needed.

ADCs 545 are essentially the same implementation as on ADC test chip 400 in this embodiment, except that clocking is optimized and ASIC clock control now drives the ADC conversion. This conversion is strobed by an internal control signal that is initiated by sequencer 510.

A key architectural feature is the ability to synchronize multiple ASICs. For example, one of the detectors being considered for WFIRST could provide as many as 64 outputs. At least two ASICs would be required to support this mode of operation, and this can be accommodated by design. The "slice control" signals in the mSPI provide the detailed synchronization features that enable using the resources in multiple ASICs in this manner.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A detector system, the detector system comprising:
a detector comprising an array of diodes configured to detect photons;
a read-out integrated circuit (ROIC) operably connected to the array of diodes and configured to multiplex and output analog signals from the array of diodes;
an application-specific integrated circuit (ASIC) configured to receive the output analog signals from the ROIC, convert the received analog signals to digital signals, and output the digital signals; and
processing circuitry configured to receive and process the digital signals output by the ASIC, wherein
the ASIC is connected to the ROIC and the processing circuitry via respective cables,
the cable connecting the ASIC to the ROIC is shorter than the cable connecting the ASIC to the processing circuitry, and
the cable connecting the ASIC to the ROIC has a lower impedance and less thermal insulation than the cable connecting the ASIC to the processing circuitry, and
wherein the ASIC includes a sequencer and a CMOS, the CMOS located proximate to the detector as compared to the processing circuitry and providing a reference voltage.

2. The detector system of claim 1, wherein
the detector, ROIC, and ASIC are configured to operate at temperatures below 100K, and
the processing circuitry is configured to operate at a temperature of at least 290K.

3. The detector system of claim 1, wherein
the analog signals from the ROIC comprise a plurality of video channels, and
the ASIC is configured to provide analog biases, digital clocking, and analog-to-digital conversion functions for the plurality of video channels.

4. The detector system of claim 1, wherein the ROIC, ASIC, and processing circuitry are configured such that heat emitted therefrom does not degrade performance of the detector by more than 10%.

5. The detector system of claim 1, wherein the ASIC comprises an analog-to-digital chip, the analog-to-digital chip comprising:

a plurality of selectable resistive or capacitive preamplifiers configured to amplify the analog signals from the ROIC;

a sample and hold amplifier (SHA) configured to condition output from the plurality of preamplifiers and output a conditioned analog signal; and an analog-to-digital converter (ADC) configured to receive the conditioned analog signal from the SHA and convert it into a digital signal.

6. The detector system of claim 5, wherein the ADC comprises a multi-sample conversion architecture configured to use a 2-step 5-bit flash conversion, followed by an 8-bit successive approximation conversion.

7. The detector system of claim 1, wherein the ASIC is configured to send master Serial Peripheral Interface (mSPI) serial status data to, and receive mSPI serial control data from, the processing circuitry, the mSPI serial control providing a primary control interface for the processing circuitry and providing ASIC memory and register access.

8. The detector system of claim 1, wherein the ASIC is configured to provide detector Serial Peripheral Interface (dSPI) serial control for configuration of the ROIC, clocking for digital control of the ROIC from a pattern generator, and quiet voltages to the ROIC.

9. The detector system of claim 1, wherein the sequencer comprises:

an execution unit and a pattern generator, wherein the sequencer is configured to control a bank of biases and detector control (clock) outputs directly through configuration registers of the execution unit and the pattern generator, respectively.

10. The detector system of claim 1, wherein the ASIC comprises:

a microcontroller configured to provide control functions through its ability to read and write all configuration registers and memories of the ASIC using direct memory access (DMA).

11. The detector system of claim 1, wherein the ASIC comprises:

a plurality of preamplifiers configured to receive and amplify the analog signals output from the ROIC;

a plurality of analog-to-digital converter (ADCs) configured to convert the amplified analog signals from the plurality of preamplifiers to digital signals; and a plurality of math blocks configured to perform configurable processing of the digital signals from the plurality of ADCs.

12. An application-specific integrated circuit (ASIC), the ASIC comprising:

a plurality of preamplifiers configured to receive and amplify analog signals from a read-out integrated circuit (ROIC) of a detector, the analog signals comprising data pertaining to infrared or near-infrared photons detected by diodes of the detector;

a plurality of analog-to-digital converters (ADCs) configured to convert the amplified analog signals from the plurality of preamplifiers to digital signals; and a plurality of math blocks configured to perform configurable processing of the digital signals from the plurality of ADCs to process the data pertaining to the infrared or near-infrared photons, and wherein the ASIC includes a sequencer and a CMOS, the CMOS located proximate to the detector as compared to the processing circuitry and providing a reference voltage.

13. The ASIC of claim 12, wherein the ASIC is connected to the read-out integrated circuit (ROIC) and processing circuitry via respective cables, the cable connecting the ASIC to the ROIC is shorter than the cable connecting the ASIC to the processing circuitry, and the cable connecting the ASIC to the ROIC has a higher impedance and better insulation than the cable connecting the ASIC to the processing circuitry.

14. The ASIC of claim 13, wherein the ROIC is operably connected to a detector, the detector, ROIC, and ASIC are configured to operate at temperatures below 100K, and the processing circuitry is configured to operate at a temperature of at least 290K.

15. The ASIC of claim 12, wherein the ASIC is configured to provide analog biases, digital clocking, and analog-to-digital conversion functions for a plurality of video channels.

16. The ASIC of claim 12, wherein the ASIC is configured to send master Serial Peripheral Interface (mSPI) serial control data to, and receive mSPI serial control data from, the processing circuitry, the mSPI serial control providing a primary control interface for the processing circuitry and providing ASIC memory and register access.

17. The ASIC of claim 12, wherein the ASIC is configured to provide detector Serial Peripheral Interface (dSPI) serial control for configuration of the ROIC, clocking for digital control of the ROIC from a pattern generator, and quiet voltages to the ROIC.

18. The ASIC of claim 12, wherein the ASIC further comprises:

a microcontroller configured to provide control functions through its ability to read and write all configuration registers and memories of the ASIC using direct memory access (DMA).

19. The ASIC of claim 12, wherein the ASIC further comprises:

a sequencer comprising an execution unit and a pattern generator, wherein the sequencer is configured to control a bank of biases and detector control (clock) outputs directly through configuration registers of the execution unit and the pattern generator, respectively.

20. An application-specific integrated circuit (ASIC), the ASIC comprising:

a plurality of preamplifiers configured to receive and amplify analog signals;

a plurality of analog-to-digital converters (ADCs) configured to convert the amplified analog signals from the plurality of preamplifiers to digital signals; and a plurality of math blocks configured to perform configurable processing of the digital signals from the plurality of ADCs, wherein the ASIC is connected to a read-out integrated circuit (ROIC) and processing circuitry via respective cables, the cable connecting the ASIC to the ROIC is shorter than the cable connecting the ASIC to the processing circuitry, and the cable connecting the ASIC to the ROIC has a lower impedance and less thermal insulation than the cable connecting the ASIC to the processing circuitry, and wherein the ASIC includes a sequencer and a CMOS, the CMOS located proximate to the detector as compared to the processing circuitry and providing a reference voltage.

* * * * *